Jan. 24, 1967 S. V. PUIDOKAS 3,299,736
CLUTCH LINK
Filed Nov. 12, 1964
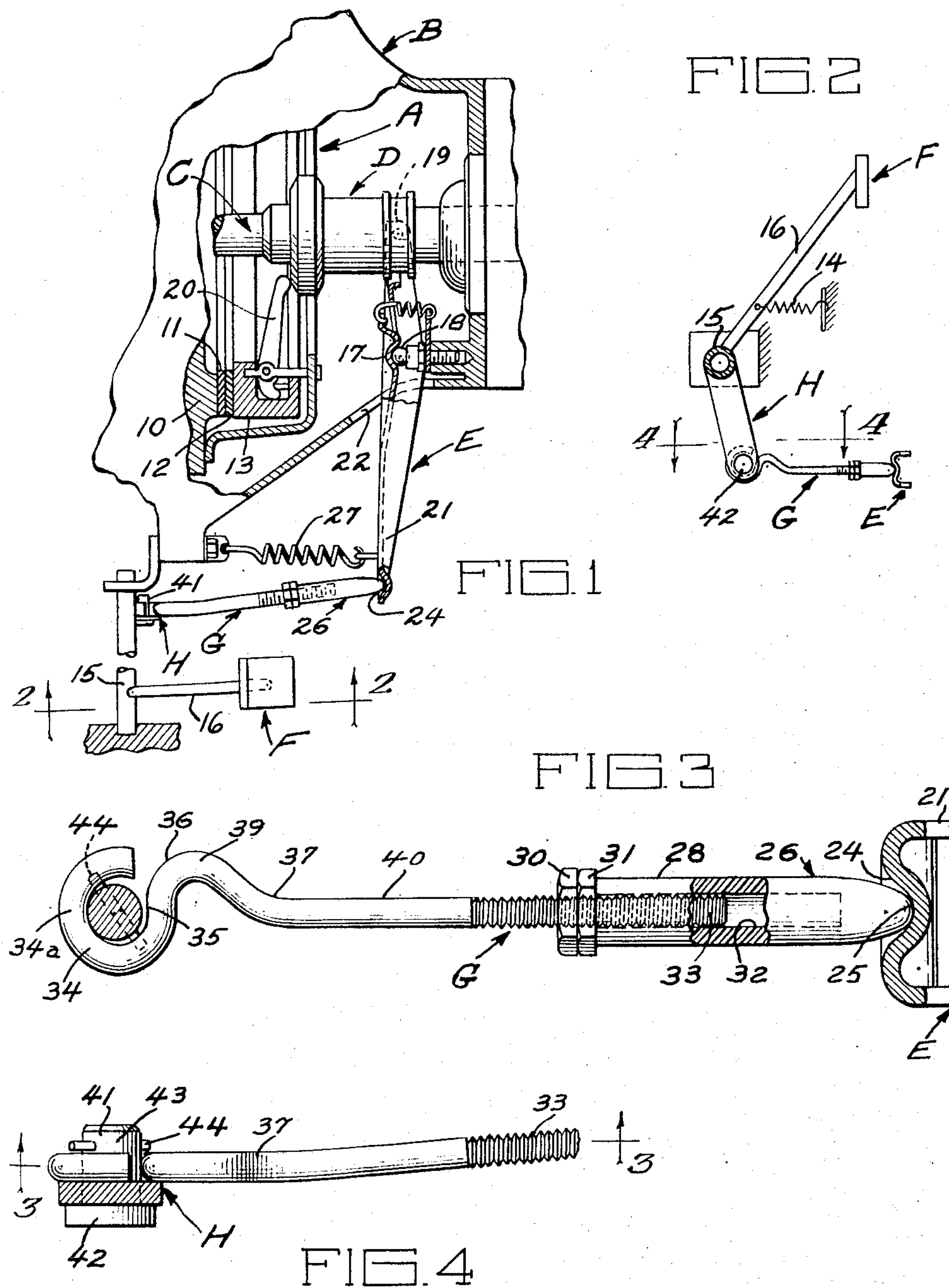
INVENTOR.
STANLEY V. PUIDOKAS
BY
Carl J. Barbee
ATTORNEY

United States Patent Office 3,299,736
Patented Jan. 24, 1967

3,299,736

CLUTCH LINK

Stanley V. Puidokas, Kenosha, Wis., assignor to American Motors Corporation, Kenosha, Wis., a corporation of Maryland Filed Nov. 12, 1964, Ser. No. 410,680
3 Claims. (Cl. 74—586)

The invention relates to a clutch link for interposition between an actuating lever and the throw-out lever of a vehicle clutch assembly.

In prior art devices of this type, such a link was commonly fabricated from a rod by flattening the end thereof and then punching or broaching a hole therein. Thus a "closed" eye was formed at the driving end. An adjustable cap assembly was provided at the driven end including a lock nut threaded onto the end of the rod, an elongated internally threaded nut threaded onto the rod next to the lock nut and a hardened steel nose threaded into the end of the cap nut. Such a link assembly involves considerable cost and one object of the invention is to reduce the cost of such a clutch link.

A further specific object of the invention is to provide a clutch link formed of a continuous length of wire and having an unclosed eye at the driving end.

Another object is to provide a clutch link formed of a continuous length of wire and having a threaded end for receiving a non-threaded nose portion formed of a synthetic resin material such as nylon.

Other objects and advantages will be apparent from the ensuing specification and appended drawing in which:

FIGURE 1 is a plan view of the clutch link as employed with a manually operated vehicle clutch assembly.

FIGURE 2 is a view taken on the line 2—2 of FIGURE 1.

FIGURE 3 is an enlarged view, partially in section, and taken on the line 3—3 of FIGURE 4.

FIGURE 4 is a view taken on the line 4—4 of FIGURE 2.

In general I have shown a vehicle clutch A mounted in clutch housing B for selectively controlling the actuation of shaft C. A clutch release bearing assembly D is reciprocal on shaft C and the clutch throw-out or release lever E in response to actuation of clutch pedal F actuates the release bearing assembly for effecting clutch release as desired. The clutch link G is interposed between the actuating lever H and the throw-out lever.

I have only shown a portion of the vehicle clutch A since it is of conventional construction. The driving clutch member 10 has its clutch lining 11 normally engaged with the clutch lining 12 of the driven clutch member 13. Clutch engagement is effected under the inducement of spring 14 and clutch release is effected by depressing pedal F against the resistance of spring 14. The mechanism for actuating the clutch link and throw-out lever is in the form of a bellcrank made up of clutch pedal lever 16, shaft 15 and actuating lever H.

The clutch throw-out lever E has a bearing portion 17 pivotally engaged with the bearing pivot 18. The throw-out lever is bifurcated at one end, only one leg 19 of the fork being shown in FIGURE 1. The bifurcated end of the throw-out lever engages the clutch release bearing assembly D which causes the clutch fingers 20 to act against the driven clutch member 13, shifting same axially out of engagement with clutch member 10. The other end of the throw-out lever 21 protrudes through the opening 22 in clutch housing B and has a bearing socket 24 at its free end for receiving the spheroidal nose 25 of the clutch link cap 26.

A tension spring 27 continuously urges the clutch throw-out lever against the nose of the clutch link cap at all times. The foregoing described components, with the exception of the link bearing cap, are conventional.

The clutch link is formed from ordinary steel wire stock and one end may be roll threaded for receiving the internally threaded lock nuts 30 and 31. The cap 26 may be formed of a material, such as nylon, having an elongated portion 28 provided with an unthreaded axial bore 32 to permit the cap to be manually guided onto the threaded end 33 of the link shank 40. A somewhat snug fit is desirable. To adjust the length of the clutch link it is only necessary to loosen nut 30 and then adjust nut 31 as desired. Then nut 30 is re-tightened against nut 31 for locking purposes.

The driving or actuating end of the clutch link is formed with an unclosed eye 34 which may have an arcuate contour **34*a* throughout a major portion thereof, terminating with a substantially straight bearing portion 35. The eye terminates with the bent portion 36 which merges with the re-bent section 37 to form the laterally offset portion 39 therebetween. At the re-bent area 37 the continuing shank portion 40 becomes substantially axially aligned with the line of force imposed on the link by the actuating pin 41. Since the eye portion is provided with the substantially straight bearing area 35, the cylindric surface of the actuating pin has substantially "point" contact with the link bearing surface thereby reducing friction, noise and undue wear. The line of force imposed by the actuating pin would be approximately along a diametric line drawn through the axis of the pin and continuing along the axis of the shank portion 40 of the link. Since the shank portion 40** of the link is substantially axially aligned with the line of force, it is thus subjected to a minimum of undesirable lateral thrust.

The actuating pin may have an enlarged head portion 42 and the shank portion 43 which extends through a suitable opening in the actuating lever H. A locking pin 44 may be anchored at the end of the actuating pin, as by being forced through a diametric bore therein, and such locking pin is of sufficient length (as best viewed in FIGURE 3) to overhang the eye portion of the link to prevent same from becoming disengaged from the actuating pin.

The eye portion of the link may be heat treated and liquid carburized to obtain a case depth of about .005 to .007". The eye portion of the link should be hardened to about "file hardness" to prolong the wearing life of the link.

I claim:

1. For use with a clutch mounted within a clutch housing and including a clutch throw-out lever pivotally mounted for rocking movement to effect disengagement of the clutch and an actuating lever for initiating actuation of the throw-out lever, the improved apparatus comprising:

(a) a pin mounted on the actuating lever, (b) a link interposed between the actuating lever and the throw-out lever for transmitting reciprocatory motion imparted thereto by the actuating lever to one end of the throw-out lever, said link including:

(1) an actuating portion in the form of a continuous wire having threads at one end, an unclosed eye at the other end and a shank interconnecting the eye and the threads, (2) a cap carried on the threads and having a bearing surface engaging the throw-out lever, (3) adjustment means on the threads for coacting with the cap, (c) said eye encircling a major portion of the circumference of the pin and having a bearing surface engaged by the pin, the shank portion of the link having a section thereof bent outwardly so as to project laterally beyond a diametric line drawn through the pin and continuing along the axis of the threads and then re-bent inwardly so as to be substantially aligned with such line.

2. For use with a clutch mounted within a clutch housing and including a clutch throw-out lever pivotally mounted for rocking movement to effect disengagement of the clutch and an actuating lever for initiating actuation of the throw-out lever, the improved apparatus comprising:

(a) a pin mounted on the actuating lever, (b) a link interposed between the actuating lever and the throw-out lever for transmitting reciprocatory motion imparted thereto by the actuating lever to one end of the throw-out lever, said link including:

(1) an actuating portion in the form of a continuous wire having threads at one end, an unclosed eye at the other end and a shank interconnecting the eye and the threads, (2) a bearing member on the link at the threaded end and engaging the throw-out lever, (c) said eye encircling a major portion of the circumference of the pin and having a bearing surface engaged by the pin, the shank portion of the link having a section thereof bent outwardly so as to project laterally beyond a diametric line drawn through the pin and continuing along the axis of the threads and then re-bent inwardly so as to be substantially aligned with such line.

3. Apparatus as set forth in claim 1 wherein the eye includes a substantially arcuate portion and a substantially straight portion forming the bearing surface portion and wherein the bent and re-bent section is substantially S shaped.

References Cited by the Examiner

UNITED STATES PATENTS

| | | | |
|---|---|---|---|
| 912,221 | 2/1909 | Willis | 74—586 |
| 2,018,301 | 10/1935 | Ferry | 85—35 |
| 2,050,481 | 8/1936 | Blazek et al. | 74—586 |

FRED C. MATTERN, Jr., *Primary Examiner.*

W. S. RATLIFF, *Assistant Examiner.*